United States Patent
Cantonetti

(10) Patent No.: US 8,304,486 B2
(45) Date of Patent: Nov. 6, 2012

(54) WATER-BASE ADHESIVE MIX FOR PRODUCING TYRES

(75) Inventor: Veronica Cantonetti, Rome (IT)

(73) Assignee: Bridgestone Corporation, Tokyo (JP)

( * ) Notice: Subject to any disclaimer, the term of this patent is extended or adjusted under 35 U.S.C. 154(b) by 684 days.

(21) Appl. No.: 12/373,624

(22) PCT Filed: Jul. 12, 2007

(86) PCT No.: PCT/EP2007/057216
§ 371 (c)(1),
(2), (4) Date: Jul. 9, 2009

(87) PCT Pub. No.: WO2008/006894
PCT Pub. Date: Jan. 17, 2008

(65) Prior Publication Data
US 2009/0318601 A1 Dec. 24, 2009

(30) Foreign Application Priority Data
Jul. 13, 2006 (IT) .............. TO2006A0512

(51) Int. Cl.
*C08C 19/20* (2006.01)
*C08F 8/22* (2006.01)
*C08F 8/30* (2006.01)
*C08F 283/04* (2006.01)
*C08G 18/08* (2006.01)
*C08G 18/28* (2006.01)
*C08J 3/00* (2006.01)
*C08K 3/20* (2006.01)
*C08L 75/00* (2006.01)

(52) U.S. Cl. ........ 524/507; 524/589; 524/590; 524/591; 524/839; 524/840; 525/123; 525/354; 525/453; 525/455

(58) Field of Classification Search .................. 524/507, 524/589, 590, 591, 839, 840; 525/123, 455, 525/354, 453
See application file for complete search history.

(56) References Cited

U.S. PATENT DOCUMENTS

| | | | | |
|---|---|---|---|---|
| 4,477,619 A | * | 10/1984 | Lattimer et al. | 524/171 |
| 5,326,853 A | * | 7/1994 | Hayes | 524/813 |
| 7,582,698 B2 | * | 9/2009 | Lubnin et al. | 524/589 |

FOREIGN PATENT DOCUMENTS

| | | |
|---|---|---|
| JP | 2004-300617 A | 10/2004 |
| WO | 2004/050736 A1 | 6/2004 |

* cited by examiner

*Primary Examiner* — Patrick Niland
(74) *Attorney, Agent, or Firm* — Sughrue Mion, PLLC

(57) ABSTRACT

A water-base adhesive mix for producing tires and containing, by weight, 20 to 80% water, 10 to 40% of a cross-linkable unsaturated-chain polymer base, 0.2 to 1% sulphur, 1 to 25% of a reinforcing filler, 1 to 10% of emulsifiers, 2 to 8% of a resin which cross-links by reaction with polyisocyanates, and 0.5 to 5% of an aqueous dispersion having blocked aromatic polyisocyanates with an activation temperature of 120 to 160° C. The blocked aromatic polyisocyanates are produced by reaction of an aromatic polyisocyanate (a), a blocking agent (b), and a nonionic diol alkoxylate (c) of the general formula (I)

$$R_1CH_2O(CH_2CH_2O)_n(CH_2CHCH_3O)_mR_2 \quad (I)$$

where
$R_1$ is

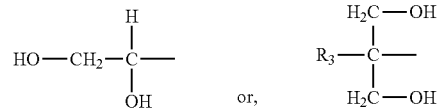

$R_2$ and $R_3$ are the same or different, and are selected from methyl, ethyl, n-propyl, i-propyl, n-butyl, i-butyl;
n is a whole number from 0 to 40
m is a whole number from 0 to 40
n+m is a whole number from 20 to 80.

7 Claims, No Drawings

WATER-BASE ADHESIVE MIX FOR PRODUCING TYRES

TECHNICAL FIELD

The present invention relates to a water-base adhesive mix for producing tyres.

BACKGROUND ART

In tyre manufacturing, adhesive mixes or so-called cements are normally organic-solvent-based mixes, which provide for extremely strong grip and are easy to use, mainly on account of the ability of rubber to dissolve in the organic solvents and so blend with other rubber to form practically one piece when the organic solvent evaporates.

The major drawback of adhesive mixes of this sort is the large amount of organic solvent they contain.

Recent European regulations have imposed a drastic reduction in the use of organic solvents in the tyre industry, thus forcing tyre manufacturers to seek alternative solutions to ensure firm adhesion of the various layers of rubber.

A demand therefore exists for adhesive mixes, for use in the tyre industry, containing no organic solvents, and which ensure adequate adhesion of the various rubber parts of the tyre.

DISCLOSURE OF INVENTION

It is an object of the present invention to provide a water-base adhesive mix for producing tyres, characterized by comprising, by weight, 20 to 80% water, 10 to 40% of a cross-linkable unsaturated-chain polymer base, 0.2 to 1% sulphur, 1 to 25% of a reinforcing filler, 1 to 10% of emulsifiers, 2 to 8% of a resin which cross-links by reaction with polyisocyanates, and 0.5 to 5% of an aqueous dispersion comprising blocked aromatic polyisocyanates with an activation temperature of 120 to 160° C.; said blocked aromatic polyisocyanates being produced by reaction of a polyisocyanate (a), a blocking agent (b), and a nonionic diol alkoxylate (c) of the general formula (I)

$$R_1CH_2O(CH_2CH_2O)_n(CH_2CHCH_3O)_mR_2 \quad (I)$$

where
$R_1$ is

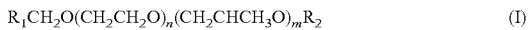

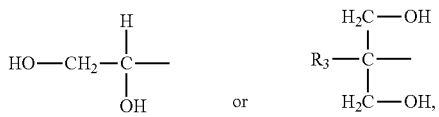

$R_2$ and $R_3$ are the same or different, and are selected from methyl, ethyl, n-propyl, i-propyl, n-butyl, i-butyl;
n is a whole number from 0 to 40
m is a whole number from 0 to 40
n+m is a whole number from 20 to 80.

The polyisocyanate (a) is preferably an aromatic polyisocyanate.

Said resin which cross-links by reaction with polyisocyanates is preferably a polyurethane resin.

The blocking agent (b) is preferably methyl ethyl ketoxime.

The aqueous dispersion contained in the water-base adhesive mix according to the present invention is described in Patent Application WO2004/050736, the content of which is included herein by way of reference.

The water-base adhesive mix according to the present invention preferably comprises a phenol-base adhesive resin.

The cross-linkable, unsaturated-chain polymer base preferably ranges between 15 and 30%.

The reinforcing filler preferably comprises 8 to 16% of carbon black.

The following non-limiting examples are purely indicative, for a clear understanding of the invention

EXAMPLES

Three adhesive mixes (A, B, C) in accordance with the present invention were produced containing different amounts of polyurethane resin and aqueous dispersion.

As will be clear to anyone skilled in the art, in addition to natural rubber, the adhesive mixes according to the present invention may comprise any cross-linkable-chain polymer base obtained by polymerization of conjugate dienes and/or aliphatic or aromatic vinyl monomers. For example, possible polymer bases are selected from the group comprising natural rubber; 1,4-cis polyisoprene; isoprene-isobutene copolymers, possibly halogenated; butadiene-acrylonitrile; styrene-butadiene; styrene-butadiene-isoprene terpolymers in solution or emulsion; and ethylene-propylene-diene terpolymers. The above polymer bases may be used singly or mixed.

In addition to polyurethane resin, the adhesive mixes according to the present invention may comprise other resin capable of cross-linking with polyisocyanates.

To better assess the advantages of the invention, two control adhesive mixes were produced: a first control adhesive mix (D) in the form of a known organic-solvent-based adhesive mix; and a second control adhesive mix (E) of the same composition as the present invention, but without the aqueous dispersion of blocked aromatic polyisocyanates and the polyurethane resin.

The adhesive mixes according to the invention and the control adhesive mixes were adhesion tested relative to both green and cured rubber.

Table I shows the compositions, in percentages by weight, of the adhesive mixes according to the invention.

TABLE I

|  | A | B | C |
|---|---|---|---|
| WATER | 50.0 | 50.0 | 50.0 |
| NATURAL RUBBER | 25.0 | 25.0 | 25.0 |
| CARBON BLACK | 13.0 | 13.0 | 13.0 |
| ZINC OXIDE | 1.0 | 1.0 | 1.0 |
| ADHESIVE RESIN | 2.5 | 2.5 | 2.5 |
| POLYURETHANE RESIN | 0.5 | 5.0 | 5.0 |
| AQUEOUS DISPERSION OF BLOCKED AROMATIC POLYISOCYANATES | 0.5 | 2.5 | 5.0 |
| SULPHUR | 0.5 | 0.5 | 0.5 |
| SULPHONAMIDE | 0.5 | 0.5 | 0.5 |
| EMULSIFIERS | 5.0 | 5.0 | 4.8 |

Table II shows the compositions, in percentages by weight, of the control adhesive mixes.

TABLE II

|  | D | E |
|---|---|---|
| WATER | — | 50.0 |
| HEXANE | 70 | — |
| NATURAL RUBBER | 18.0 | 25.0 |
| CARBON BLACK | 9.0 | 13.0 |
| STEARIC ACID | 0.6 | — |
| ZINC OXIDE | 0.3 | 1.0 |

TABLE II-continued

|  | D | E |
|---|---|---|
| ADHESIVE RESIN | 2.0 | 5.0 |
| SULPHUR | 0.3 | 0.5 |
| SULPHONAMIDE | 0.3 | 0.5 |
| EMULSIFIERS | — | 5.0 |

The polyurethane resin used is manufactured by BAYER and marketed by the trade name DISPERCOLL U54.

The aqueous dispersion is manufactured by CESALPINIA CHEMICALS and marketed by the trade name ROLFLEX BK8.

The mixes were produced using standard known procedures.

Laboratory Tests

Each of the mixes produced was tested on both green and cured rubber. Table III shows the results of adhesion testing in accordance with ASTM Standard D1876.

The rheometric properties and viscosity of each mix were tested in accordance with ASTM Standard D5289 and ISO Standard 1652 respectively. The results are shown in Table III.

TABLE III

|  | A | B | C | D | E |
|---|---|---|---|---|---|
| Viscosity (cps) | 100 | 100 | 100 | 100 | 100 |
| ML (dNm) | 3.4 | 3.4 | 3.5 | 1.3 | 3.9 |
| MH (dNm) | 12.0 | 12.5 | 13.0 | 14.8 | 10.8 |
| T10 | 0.3 | 0.3 | 0.3 | 0.5 | 0.3 |
| T50 | 0.80 | 0.80 | 0.80 | 1.10 | 0.80 |
| T90 | 2.20 | 2.30 | 2.30 | 3.00 | 2.30 |
| Green rubber adhesion (N/mm) | 1.50 | 1.50 | 1.50 | 2.00 | 0.50 |
| Cured rubber adhesion* (N/mm) | 12.00 | 13.00 | 15.00 | 20.00 | 10.00 |

*The cured rubber was produced in accordance with ASTM Standard 1382, by curing for 10 minutes at a constant temperature of 160° C.

As shown in Table III, the adhesive mixes according to the present invention have good adhesion characteristics, while impairing none of the other characteristics, such as viscosity and geometry.

The invention claimed is:

1. A water-base adhesive mix for producing tyres, characterized by comprising, by weight, 20 to 80% water, 10 to 40% of a cross-linkable unsaturated-chain polymer base, 0.2 to 1% sulphur, 1 to 25% of a reinforcing filler, 1 to 10% of emulsifiers, 2 to 8% of a resin which cross-links by reaction with polyisocyanates, and 0.5 to 5% of an aqueous dispersion comprising blocked aromatic polyisocyanates with an activation temperature of 120 to 160° C.; said blocked aromatic polyisocyanates being produced by reaction of a polyisocyanate (a), a blocking agent (b), and a nonionic diol alkoxylate (c) of the general formula (I)

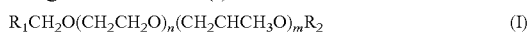

where $R_1$ is

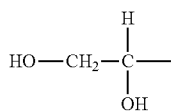 or, 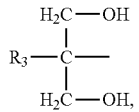

$R_2$ and $R_3$ are the same or different, and are selected from methyl, ethyl, n-propyl, i-propyl, n-butyl, i-butyl;

n is a whole number from 0 to 40 m is a whole number from 0 to 40 n+m is a whole number from 20 to 80.

2. An adhesive mix as claimed in claim 1, characterized in that said polyisocyanate (a) is an aromatic polyisocyanate.

3. An adhesive mix as claimed in claim 1, characterized in that said resin which cross-links by reaction with polyisocyanates is a polyurethane resin.

4. An adhesive mix as claimed in claim 1, characterized in that the blocking agent (b) is methyl ethyl ketoxime.

5. An adhesive mix as claimed in claim 1, characterized by comprising a phenol-base adhesive resin.

6. An adhesive mix as claimed in claim 1, characterized by containing 15 to 30% by weight of the cross-linkable unsaturated-chain polymer base.

7. An adhesive mix as claimed in claim 1, characterized in that said reinforcing filler comprises 8 to 16% by weight of carbon black.

* * * * *